United States Patent
Nagai et al.

(10) Patent No.: US 6,696,017 B2
(45) Date of Patent: Feb. 24, 2004

(54) NI-BASE BRAZING ALLOY

(75) Inventors: Shozo Nagai, Kyoto (JP); Kanichi Tanaka, Yawata (JP); Kensuke Hidaka, Kyoto (JP)

(73) Assignee: Fukuda Metal Foil & Powder Co., Ltd., Kyoto (JP)

(*) Notice: Subject to any disclaimer, the term of this patent is extended or adjusted under 35 U.S.C. 154(b) by 0 days.

(21) Appl. No.: 09/878,333

(22) Filed: Jun. 12, 2001

(65) Prior Publication Data

US 2002/0085943 A1 Jul. 4, 2002

(30) Foreign Application Priority Data

Nov. 15, 2000 (JP) ........................................ 2000-347364

(51) Int. Cl.[7] .............................................. C22C 19/05
(52) U.S. Cl. ........................ 420/442; 420/443; 420/445
(58) Field of Search ................................ 420/442, 443, 420/445; 148/428

(56) References Cited

U.S. PATENT DOCUMENTS

| | | | | |
|---|---|---|---|---|
| 4,507,264 A | * | 3/1985 | Stern | 420/443 |
| 5,603,891 A | * | 2/1997 | Brill | 420/443 |
| 5,628,814 A | * | 5/1997 | Reeves et al. | 420/443 |
| 6,203,754 B1 | * | 3/2001 | Sugiyama | 420/442 |

FOREIGN PATENT DOCUMENTS

| | | |
|---|---|---|
| EP | 0531775 A1 | 3/1993 |
| GB | 2347939 | 9/2000 |
| JP | 09-225679 | 9/1997 |

OTHER PUBLICATIONS

"Nickel, Cobalt, and Their Alloys", pub. by ASM International, Dec. 2000, pp. 17 and 167.*

* cited by examiner

Primary Examiner—Roy King
Assistant Examiner—Harry D. Wilkins, III
(74) Attorney, Agent, or Firm—Westerman, Hattori, Daniels & Adrian, LLP

(57) ABSTRACT

The present invention relates to a Ni-base brazing alloy. The alloy has a good wettability toward a material to be brazed when melting, an excellent corrosion resistance and a high strength. The alloy is used for process of joining two pieces of metal such as stainless steel. The alloy contains Cr in an mount of 25 to 35% by weight, P in an amount of 4 to 8% by weight, Si in an amount of 3 to 6% by weight, wherein the total amount of P and Si is 9 to 11.5% by weight, at least one selected from a group consisting of Al, Ca, Y and misch metal in an amount of 0.01 to 0.10% by weight, and the balance of Ni and unavoidable impurities.

2 Claims, 1 Drawing Sheet

$W = S/S_0$ (a)

(b)

$W = S/S_0$

NI-BASE BRAZING ALLOY

FIELD OF THE INVENTION

Figure 1:
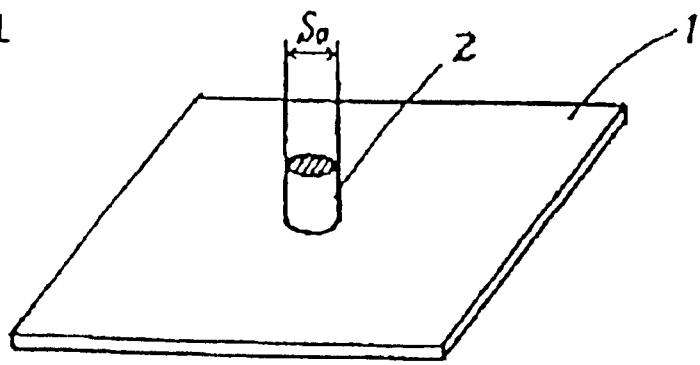
Figure 1:
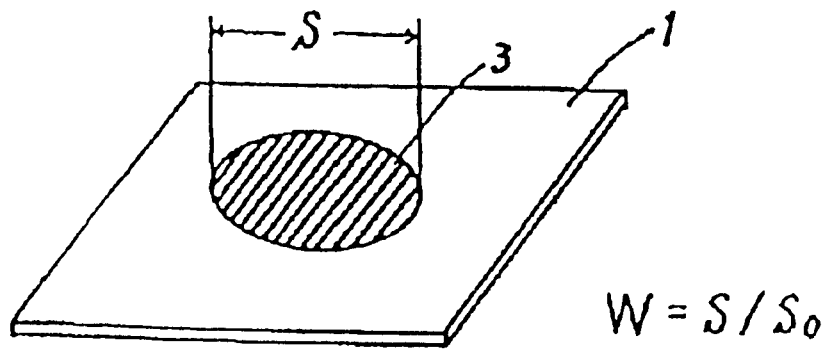

The present invention relates to a brazing alloy. In particular, the present invention relates to a Ni-base brazing alloy, the alloy having a good wetting and flowing property (to be referred to as wettability), an excellent corrosion resistance and a high strength. The alloy is used for process of joining two pieces of metal such as stainless steel.

PRIOR ART

A Ni-base brazing filler metal, defined as JIS standard (Japanese Industrial Standard) of JIS Z3265 and AWS (American Welding Society) standard of ANSI/AWS A5.8, is generally used for the process of brazing stainless steel to produce various kinds of products such as a heat exchanger and a gas turbine.

Recently, it is significantly required to provide a brazing alloy having a corrosion resistance in sulfuric acid and so on, which may be brazed at a temperature as low as possible, to form a brazed joint of high strength. The Ni-base brazing filler metal as a prior art however has several objects as follows.

As Ni-base brazing filler metal defined in the JIS and the AWS standard, there is known the alloy BNi-5 having Ni—Cr—Si composition, which has a good corrosion resistance. However, it has a high liquidus of 1150° C. so that it requires to be heated up to 1200° C. for brazing, during which the property of the stainless steal would be decreased.

There are also known the alloys BNi-1, 1A and 2 having Ni—Cr—Fe—Si—B composition and the alloys BNi-3 and 4 having Ni-Si-B composition, which provide a property of a high strength of the brazed joint, but the corrosion resistance of the stainless steel may decreased due to diffusion of B when brazed.

There are also known the alloys BNi-6 and 7 having Ni—(Cr)—P composition, which may be brazed at a comparatively low temperature of about 1000° C. These alloys also have a good wettability, but are brittle to have a low strength of the brazed joint.

On the other hand, the present inventors already disclosed Ni-base brazing alloys having a heat resistance in Japanese laid open patent application No. 9-225679 of 1997. The alloys disclosed in the above application may be brazed at a temperature as low as BNi-2. However, there found some part of the composition of the alloy defined in the application to form a slag when brazed, which may lead to have a low strength of the brazed joint.

Therefore, it is required to provide a Ni-base brazing alloy used for process of joining two pieces of metal such as stainless steel, and with the alloy brazed at a temperature as low as possible, for example at about 1100° C., to thereby prevent the property of the stainless steel from being decreased. The alloy is also accompanied with characteristics that no slag is formed when brazed, and that it has a good wettability, a high strength of the brazed joint, and an excellent corrosion resistance in sulfuric acid and so on In order to provide the alloy having above required characteristics, the present inventors have reviewed the prior alloy having a Ni—Cr—P—Si composition disclosed in Japanese laid open patent publication No. 9-225679 of 1997 to find the present alloy having a noble composition with further additives.

According to the present invention, the present alloy has a noble composition relative to above identified application. Thus, the present alloy contains Cr in an increased amount to be designed to improve the strength, which keeps having a preferable melting point and corrosion resistance. While the present alloy also contains Cr, P and Si, each amount of Cr, P and Si and the total amount of P and Si are designed the alloy to have a hypo-eutectic structure. The present alloy further contains Al, Ca, Y and/or misch metal in a small amount so that the alloy is designed to prevent a slag from forming when or after brazed and to improve the wettability. The present alloy also contains Fe, Co, Mo and/or V in an amount not to negatively influence its melting point, its wettability and its corrosion resistance so that the alloy is improved to have a higher strength, in particular of the brazed joint.

SUMMARY OF THE INVENTION

Thus, there is provided a Ni-base brazing alloy comprising Cr in an amount of 25 to 35%, P in an amount of 4 to 8%, Si in an amount of 3 to 6%, with the total amount of P and Si being 9 to 11.5%, at least one element selected from a group consisting of Al, Ca, Y and misch metal in an amount of 0.01 to 0.10%, and the balance of Ni and unavoidable impurities, by weight.

If necessary, the alloy further comprises at least one element selected from a group consisting of Fe in an amount of 20% and less, Co in an amount of 20% and less, Mo in an amount of 10% and less, and V in an amount of 5% and less, with the total amount of Fe, Co, Mo and V being 20% and less, by weight.

The additional advantages and characteristic features of the present invention will become apparent to those skills in the art by the following detailed description together with the appended drawing.

THE BRIEF DESCRIPTION OF THE FIGURES

FIG. 1 is schematically shows steps for illustrating the process of brazing test for the alloy.

DETAILED DESCRIPTION OF THE INVENTION

According to the present invention, each of the elements is contained in the alloy in an amount defined as follows. In this specification, the content of each element in the alloy is defined as percentage by weight.

According to the present invention, the Ni-base brazing alloy has an essential composition of Ni, Cr, P and Si elements. The content of each element of the essential composition is important to determine the basic properties of the obtained alloy.

According to the present invention, Cr is contained in the alloy in an amount of 25 to 35% by weight. It is preferable to contain Cr as much as possible since Cr may be solved into Ni to form a Ni—Cr solid solution so that the oxidation resistance, the heat resistance, the corrosion resistance and the strength of the obtained alloy may be improved. On the other hand, the increase of Cr content may cause a trade off for the properties of melting point and the wettability. In case of the alloy containing Cr in an insufficient amount of less than 25% by weight, it is difficult to improve the strength in the brazed point and the corrosion resistance in sulfuric acid and so on. In case of the alloy containing Cr in an excess amount of more than 35% by weight, it is probable to raise the melting point and to negatively influence the wettability with stainless steel. Thus, according to the present invention, the alloy contains Cr in an amount as defined before.

According to the present invention, the total amount of P and Si is defined as 9 to 11.5% by weight. Each of the elements P and Si remarkably influences the melting point of the obtained alloy due to the eutectic reaction with the Ni—Cr solid solution, and also influences the property relating to brazing, the corrosion resistance and the strength of the alloy. The brazing alloy according to the present invention is designed to have a hypo-eutectic structure so as to improve the strength. The total content of the elements P and Si may significantly influence the melting point and the strength of the obtained alloy. Thus, in case of the alloy having the total content of P and Si in an insufficient amount of less than 9% by weight, the obtained alloy tends to become hypo-eutectic to raise the temperature of the liquidus so that it is difficult to be brazed at a predetermined temperature. On the other hand, in case of the alloy having the total content of P and Si in an excess amount of more than 11.5% by weight, the obtained alloy becomes hyper-eutectic so that the alloy is brittle to decrease the strength Also, each of P and Si contents needs to be defined according to action and reaction occurred in all the composition containing Cr. Thus, the alloy would have a raised melting point if containing P in an insufficient amount of less than 4% and Si in an excess amount of more than 6%, by weight.

Also, the alloy would have a decreased corrosion resistance and a decreased strength if containing Si in an insufficient amount of less than 3% and P in an excess amount of more than 8%, by weight.

Therefore, the alloy needs to contain P in an amount of 4 to 8% and Si in an amount of 3 to 6% with the total content of P and Si being in an amount of 9 to 11.5%, by weight.

The present brazing alloy, having the essential composition of Ni, Cr, P and Si as described before, also contains at least one element selected from a group consisting of Al, Ca, Y and misch metal so that the alloy may be designed to have a low oxygen content to thereby prevent a slag from forming when or after brazed. Also, the alloy containing such element or elements may be designed to improve the wettability with stainless steel. However, the positive improvement as such would not be provided with the alloy if containing at least one element of Al, Ca, Y and misch metal in an insufficient total amount of less than 0.01%. On the other hand, if containing it or them in an excess total amount of more than 0.1%, a compound would produced which negatively affects the wettability or the strength of the obtained alloy. Therefore, the alloy needs to contain at least one of Al, Ca, Y and misch metal in a total amount of 0.01 to 0.10% by weight.

While the Ni-base brazing alloy according to the present invention has an excellent property relative to the prior art alloy, the present alloy further may contain Fe, Co, Mo and/or V to have a higher strength. It should be noted that even if containing these elements, an excess amount of these elements may raise the melting point of the alloy so that the alloy is led to difficulty to be brazed at a desired temperature (about 1000° C.). It also should be noted that an excess amount of these elements may cancel the improved strength of the alloy and negatively influence the corrosion resistance of the alloy. Thus, the alloy needs to contain these elements in an amount appropriately examined according to the present invention. Therefore, the present alloy may contain Fe in an amount of 20% and less, Co in an amount of 20% and less, Mo in an amount of 10% and less and V in an amount of 5% and less, by weight. If the alloy contains the combination of the selected elements, the total content of the selected elements should be in an amount of 20% and less.

Therefore, according to the present invention, the content of Fe is defined as 20% and less, the content of Co is defined as 20% and less, the content of Mo is defined as 10% and less, and the content of V is defined as 5% and less, by weight. Also, the total content of Fe, Co, Mo and V is defined as 20% and less.

The present Ni-base brazing alloy may be formed in powder, which is generally prepared by an atomizing method, and formed into a foil or a rod.

EXAMPLES AND CONTROLS

Typical examples having compositions according to the present invention and controls out of the present invention are shown as follows.

Tables 1 and 2 show each composition of the alloys prepared as the examples and the controls. Tables 1 and 2 are also accompanied with the melting points and the results for brazing test at 1100° C., transverse rupture test and corrosion test in 5% sulfuric acid.

The methods used for testing the properties are as follows.
(1) Measurement of the Melting Point (The Liquidus and the Solidus)

The alloys as examples and controls are put into an electric furnace with an atmosphere of argon gas to be melted and the melting point is measured by a heat analysis method. According to this method, a thermocouple is put into the center of the melted alloy, the thermocouple connected to a recorder for drawing a heat analysis curve by which the temperatures of the liquidus and the solidus may be read.
(2) Brazing Test The alloys as examples and controls are put into an electric furnace with an atmosphere of argon gas to be melted and thereby melted alloys are cast into a mold of graphite to obtain a rod having 5 mm in diameter. Then, the rod is cut into a sample of fine fragment, each fragment having about 5 mm in length. Then, the obtained sample is put on a base material 1 of SUS 304 stainless steel, as shown in FIG. 1(a), and the sample is heated at 1100° C. for 30 minutes in a vacuum atmosphere of $10^{-3}$ torr for brazing. After brazing, the area S is measured into which the melted sample 3 spreads, as shown in FIG. 1(b). The measured area S is divided by the cross sectional area $S_0$ of the sample 2 before brazed to obtain a spread coefficient W of the melted alloy in brazing, namely $S/S_0$, which may provide a useful estimation for the wettability toward the base material of SUS 304 stainless steel. Further, the appearances after brazing test are examined to check whether a slag is formed or not.
(3) Transverse Rupture Test The alloys as examples and controls are put into an electric furnace with an atmosphere of argon gas to be melted and thereby melted alloys are sucked by a quartz pipe having 5 mm in inside diameter followed to be solidified and then cut into sample fragments, each sample fragment having 35 mm in length.

The obtained sample fragment is set on an transverse tester (transverse length; 25.4 mm), and weighted by a universal testing machine to measure a weight when broken. The measured weight produces transverse rupture strength ($kgf/mm^2$) by calculation, which may provide a useful estimation of the strength.
(4) Corrosion Test in 5% Sulfuric Acid The alloys as examples and controls are put into an electric furnace with an atmosphere of argon gas to be melted and thereby melted alloys are cast into a shell mold to obtain a rod in a form of quadratic prism, each side of which has 10 mm in length. The rod is cut at every 20 mm length to have a size of 10 mm×10 mm×20 mm, followed by that the surface of the cut rod is abraded and grinded by #240 paper to obtain a sample fragment. Thereby obtained sample fragment is put into a beaker having 300 cc internal volume containing a sulfuric acid solution having a concentration of 5% and the corrosion test is carried out by means of a whole immersion test. The test is carried out at 60° C. and the test period is defined for 24 hours. The weight and the surface area of the sample fragment before and after immersed in the solution are measured and then calculated to produce a weight loss (mg/m² s), which may provide a useful estimation of corrosion resistance in a sulfuric acid solution.

TABLE 1

| No. | Ni | Cr | P | Si | Al | Ca | Y | M.M. | Others | Melting point (° C.) Solidus | Melting point (° C.) Liquidus | Brazing at 1100° C. co-efficient W | Brazing at 1100° C. co-efficient Slag | Transverse rupture strength (kgf/mm²) | Weight loss in 5% sulfric acid solution (mg/m²·s) |
|---|---|---|---|---|---|---|---|---|---|---|---|---|---|---|---|
| The alloys according to the present invention | | | | | | | | | | | | | | | |
| (1) | bal. | 25.0 | 6.0 | 4.0 | 0.01 | — | — | — | — | 980 | 1055 | 50 | no | 84 | 0.008 |
| (2) | bal. | 29.0 | 6.2 | 3.8 | — | 0.01 | — | — | — | 985 | 1040 | 50 | no | 94 | 0.001 |
| (3) | bal. | 29.7 | 6.1 | 4.1 | 0.04 | — | 0.01 | — | — | 980 | 1025 | 50 | no | 90 | 0.000 |
| (4) | bal. | 30.1 | 6.0 | 4.0 | — | 0.03 | 0.03 | — | — | 980 | 1030 | 50 | no | 91 | 0.000 |
| (5) | bal. | 35.0 | 5.8 | 4.2 | — | — | 0.01 | — | — | 980 | 1035 | 50 | no | 86 | 0.001 |
| (6) | bal. | 31.5 | 6.4 | 4.0 | — | — | — | 0.01 | — | 980 | 1010 | 50 | no | 91 | 0.001 |
| (7) | bal. | 27.9 | 5.6 | 3.9 | 0.02 | — | — | 0.06 | — | 980 | 1060 | 50 | no | 84 | 0.000 |
| (8) | bal. | 27.0 | 4.0 | 6.0 | 0.10 | — | — | — | — | 980 | 1050 | 40 | no | 89 | 0.003 |
| (9) | bal. | 30.0 | 8.0 | 3.0 | 0.05 | 0.01 | 0.01 | 0.03 | — | 980 | 1010 | 40 | no | 80 | 0.002 |
| (10) | bal. | 29.0 | 6.8 | 4.7 | 0.01 | 0.05 | — | — | — | 980 | 990 | 50 | no | 90 | 0.001 |
| (11) | bal. | 28.5 | 5.0 | 4.0 | 0.02 | — | 0.02 | — | — | 980 | 1070 | 40 | no | 95 | 0.005 |
| (12) | bal. | 29.0 | 6.0 | 4.0 | 0.02 | — | — | — | Mo: 5.0 | 980 | 1000 | 50 | no | 124 | 0.000 |
| (13) | bal. | 28.5 | 6.0 | 4.2 | 0.02 | 0.03 | — | — | Mo: 10.0 | 985 | 1090 | 40 | no | 101 | 0.002 |
| (14) | bal. | 30.0 | 6.0 | 4.0 | 0.03 | — | — | — | Mo: 2.0 | 980 | 1010 | 50 | no | 120 | 0.000 |
| (15) | bal. | 30.0 | 6.0 | 4.0 | 0.02 | 0.01 | — | 0.01 | V: 5.0, Fe: 5.0 | 1010 | 1045 | 40 | no | 118 | 0.002 |
| (16) | bal. | 28.8 | 5.6 | 3.6 | — | 0.03 | 0.02 | — | Fe: 10.0 | 1000 | 1070 | 40 | no | 123 | 0.005 |
| (17) | bal. | 29.0 | 6.0 | 4.0 | 0.03 | — | — | — | Fe: 20.0 | 1030 | 1075 | 40 | no | 102 | 0.008 |
| (18) | bal. | 29.4 | 5.9 | 3.8 | — | 0.03 | — | — | Fe: 5.0 | 990 | 1045 | 50 | no | 116 | 0.002 |
| (19) | bal. | 28.8 | 6.0 | 4.0 | 0.05 | — | — | — | Mo: 5.0, Fe: 15.0 | 1000 | 1080 | 40 | no | 120 | 0.005 |
| (20) | bal. | 29.0 | 5.9 | 4.2 | — | 0.05 | — | — | Co: 10.0 | 1010 | 1075 | 40 | no | 105 | 0.003 |
| (21) | bal. | 29.2 | 6.0 | 4.2 | — | 0.05 | — | — | Co: 20.0 | 1020 | 1090 | 40 | no | 100 | 0.003 | bal; balance
M.M.; Misch Metal

TABLE 2

| No. | Ni | Cr | P | Si | Al | Ca | Y | M.M. | Others | Melting point (° C.) Solidus | Melting point (° C.) Liquidus | Brazing at 1100° C. Co-efficient W | Brazing at 1100° C. Co-efficient Slag | Transverse rupture strength (kgf/mm²) | Weight loss in 5% sulfric acid solution (mg/m²·s) |
|---|---|---|---|---|---|---|---|---|---|---|---|---|---|---|---|
| The control alloys according to the prior art | | | | | | | | | | | | | | | |
| (a) | bal. | 24.6 | 8.3 | 2.8 | — | — | — | — | — | 970 | 1030 | 50 | yes | 55 | |
| (b) | bal. | 29.0 | 7.0 | 4.7 | — | — | — | — | — | 985 | 995 | 50 | yes | 43 | |
| (c) | bal. | 28.5 | 6.0 | 4.0 | 0.13 | — | — | — | — | 980 | 1020 | 5 | no | 60 | |
| (d) | bal. | 37.0 | 3.8 | 6.2 | — | — | — | — | — | 980 | 1090 | 15 | yes | 57 | |
| (e) | bal. | 29.0 | 5.0 | 3.8 | — | — | — | — | — | 980 | 1130 | — | — | 68 | |
| (f) | bal. | 29.0 | 5.5 | 4.0 | — | — | — | — | Fe: 22.0 | 1040 | 1130 | — | — | 85 | |
| (g) | bal. | 29.0 | 6.0 | 4.2 | — | — | — | — | Mo: 15.0 | 990 | 1180 | — | — | 65 | |
| (h) | bal. | 29.0 | 5.8 | 4.0 | — | — | — | — | V: 7.0, Fe: 15.0 | 1030 | 1100 | — | — | 87 | |
| (i) | bal. | 29.0 | 6.2 | 3.8 | — | — | — | — | Co: 22.0 | 1020 | 1110 | — | — | 85 | |
| BNi-2 | bal. | 7.0 | — | 4.5 | — | — | — | — | B: 3.0, Fe: 3.0 | 970 | 1010 | 10 | no | 90 | 2.290 |
| BNi-5 | bal. | 19.0 | — | 10.2 | — | — | — | — | — | 1080 | 1140 | 10[1] | no | 90 | 0.009 |
| BNi-7 | bal. | 13.0 | 10.0 | — | — | — | — | — | — | 885 | 930 | 50[2] | no | 40 | 0.122 | bal; balance
M.M.; Misch Metal
[1] Brazed at 1200° C.
[2] Brazed at 1000° C.

Table 1 shows the results of the present alloys. It is apparent that all of the present alloys have liquidus below the temperature of 1100° C. and none of the present alloys are accompanied with formation of any slag in the brazing test at 1100° C. It also shows that all of the spread coefficients of the present alloys indicate over 40, which shows that the present alloys have an excellent wettability with SUS 304 stainless steel.

According to the result from the transverse rupture test, all of the present alloys have the traverse rupture strength of more than 80 kgf/mm². In particular, samples (12) to (21) have the strength of more than 100 kgf/mm². Thus, it is ascertained that the present alloys has a strength to be as excellent as or more excellent than alloys BNi-2 and BNi-5 as controls, and that the present alloys has 2 to 3 times of the strength of BNi-7 alloy.

Further, according to the corrosion test in a sulfuric acid solution having of 5%, all of the weight loss of the examples are in a range of 0.000~0.008 mg/m² s. Thus, the present alloys have an excellent corrosion resistant, and they are corroded less than BNi-5 alloy which was said to be excellent in the corrosion resistance.

On the other hand, table 2 relates to alloys (a) to (i) as controls, each of the alloys having a composition out of the range defined as the present invention.

Unlike the present invention, the alloy (a) has an excess amount of P, an insufficient amount of Si, and no content of Al, Ca, Y and misch metal. Also, the alloy (b) has an excess total amount of P and Si, and none of Al, Ca, Y and misch metal. Also, the alloy (d) has an excess amount of Cr, an insufficient amount of P, an excess amount of Si, and none of Al, Ca, Y and misch metal. The alloy (a), (b) or (d) may be brazed at 1100° C. but a slag is formed, which decreases a strength of the brazed joint.

The alloy (c) has an excess amount of Al so that the alloy (c) has a low spread coefficient of the melted alloy and a low strength of the brazed joint. The alloy (e) has an insufficient total amount of P and Si so that the alloy (e) has a raised liquidus which makes difficult to be brazed at 1100° C. with a lower strength of the brazed joint.

The alloy (f), (g), (h) or (i) has an excess amount of Fe, Mo, V or Co so that the alloy has a raised liquidus, by which the alloy may not be brazed at 1100° C. to have no improved strength.

Also, among the controls, the alloy BNi-2, BNi-5 or BNi-7 has a composition of Ni-base brazing filler metal defined in JIS and AWS. BNi-2 alloy may be brazed at 1100° C. but it has a significantly low corrosion resistance in sulfuric acid. On the other hand, BNi-5 alloy has a good corrosion resistance in sulfuric acid but it has a liquidus as high as 1140° C. so that it needs to be heated at 1200° C. for brazed. Also, BNi-7 alloy has a low melting point but it has an insufficient strength of the brazed joint.

According to the present invention, the alloy has an excellent wettability toward not only stainless steel base material of austenite such as SUS 304 and 316 but also stainless steel base material of ferrite and martensite such as SUS 410 and 430.

The present alloy may be preferably brazed not only in a vacuum atmosphere but also in a reductive atmosphere of hydrogen or in an inert atmosphere of argon.

Also, the present alloy has an excellent corrosion resistance not only in a sulfuric acid solution but also in an ammonia solution, a brine and various acid solutions such as nitric acid. The present alloy also has a high strength of the brazed joint.

What is claimed is:

1. A Ni-base brazing alloy comprising

Cr in an amount of 25 to 35% by weight,

P in an amount of 4 to 8% by weight,

Si in an amount of 3 to 6% by weight, wherein the total amount of P and Si is 9 to 11.55 by weight, at least one selected from a group consisting of Al, Ca, Y and misch metal in an amount of 0.01 to 0.10% by weight, and the balance of Ni and unavoidable impurities, and being capable of brazing at a brazing temperature of 1100° C.

2. A Ni-base brazing alloy according to claim 1, further comprising at least one selected from a group consisting of Fe in an amount of 20% and less by weight, Co in an amount of 20% and less by weight, Mo in an amount of 10% and less by weight, and V in an amount of 5% and less by weight, wherein the total amount of Fe, Co, Mo and V is 20% and less by weight.

* * * * *

INTER PARTES REEXAMINATION CERTIFICATE (0119th)
United States Patent
Nagai et al.

(10) Number: US 6,696,017 C1
(45) Certificate Issued: Dec. 1, 2009

(54) NI-BASE BRAZING ALLOY

(75) Inventors: Shozo Nagai, Kyoto (JP); Kanichi Tanaka, Yawata (JP); Kensuke Hidaka, Kyoto (JP)

(73) Assignee: Fukuda Metal Foil & Powder Co., Ltd., Matsubaradori-Muromachi, Nishiiru, Kyoto (JP)

Reexamination Request:
No. 95/000,365, Apr. 29, 2008

Reexamination Certificate for:
Patent No.: 6,696,017
Issued: Feb. 24, 2004
Appl. No.: 09/878,333
Filed: Jun. 12, 2001

(30) Foreign Application Priority Data

Nov. 15, 2000 (JP) .................................... 2000-347364

(51) Int. Cl.
*B23K 35/30* (2006.01)

(52) U.S. Cl. .................. 420/442; 420/443; 420/445
(58) Field of Classification Search ............. None
See application file for complete search history.

(56) References Cited

U.S. PATENT DOCUMENTS

| | | | |
|---|---|---|---|
| 3,941,588 | A | 3/1976 | Dremann |
| 6,203,754 | B1 | 3/2001 | Sugiyama |
| 6,696,017 | B2 | 2/2004 | Nagai et al. |

FOREIGN PATENT DOCUMENTS

JP 9225679 2/1977

OTHER PUBLICATIONS

Chromium Metal Overview ICDA–Paris, pp. 1–5, May 2008.*
Brazing Handbook, Fifth Edition, p. 295 (date unknown).*
"How Oxygen Affects Nickel Brazing Filler Metals" by Peaslee et al., Welding Journal, vol. 74, pp. 61–66, Jan. 1995.*
Publication: Chromium Metal: Consumptions & Fields of Application by Robert W. Bebbington. London & Scandinavian Metallurgical Co. Ltd., May 6–8, 1990.
Publication: Chromium by K. Pile (Date Unknown).
Publication: NRDC—Electrolytic Chromium Metal (www.nrdcindia.com), Apr. 30, 2001.
Publication: Jan. 4, 1997, Version of www.jmcusa.com.

* cited by examiner

*Primary Examiner*—Jerry D. Johnson

(57) ABSTRACT

The present invention relates to a Ni-base brazing alloy. The alloy has a good wettability toward a material to be brazed when melting, an excellent corrosion resistance and a high strength. The alloy is used for process of joining two pieces of metal such as stainless steel. The alloy contains Cr in an mount of 25 to 35% by weight, P in an amount of 4 to 8% by weight, Si in an amount of 3 to 6% by weight, wherein the total amount of P and Si is 9 to 11.5% by weight, at least one selected from a group consisting of Al, Ca, Y and misch metal in an amount of 0.01 to 0.10% by weight, and the balance of Ni and unavoidable impurities.

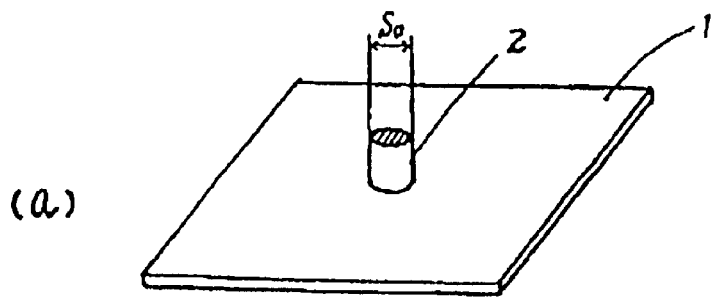

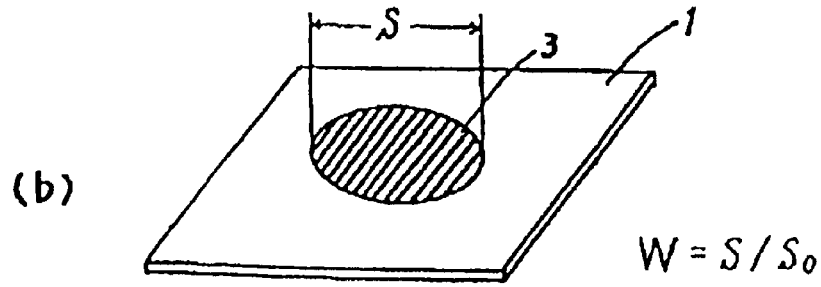

INTER PARTES REEXAMINATION CERTIFICATE ISSUED UNDER 35 U.S.C. 316

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 1 is determined to be patentable as amended.

Claim 2, dependent on an amended claim, is determined to be patentable.

1. A Ni-base brazing alloy comprising

Cr in an amount of 25 to 35% by weight,

P in an amount of 4 to 8% by weight,

Si in an amount of 3 to 6% by weight, wherein the total amount of P and Si is 9 to [11.55] *11.5*% by weight, at least one selected from a group consisting of [Al, Ca, Y and misch metal in] *Ca and Y in* an amount of 0.01 to 0.10% by weight, and the balance of Ni and unavoidable impurities, and being capable of brazing at a brazing temperature of 1100° C.*, wherein a slag is not formed when a 5 mm diameter by 5 mm length test sample of said alloy is brazed to a SUS 304 stainless steel at 1100° C. for 30 minutes in a vacuum atmosphere of $10^{-3}$ torr*.

\* \* \* \* \*